May 27, 1969        G. KING        3,446,534

AUXILIARY SELF-DUMPING TRUCK BED

Filed Jan. 13, 1967

Garvis King
INVENTOR.

May 27, 1969          G. KING          3,446,534
AUXILIARY SELF-DUMPING TRUCK BED
Filed Jan. 13, 1967          Sheet 2 of 2
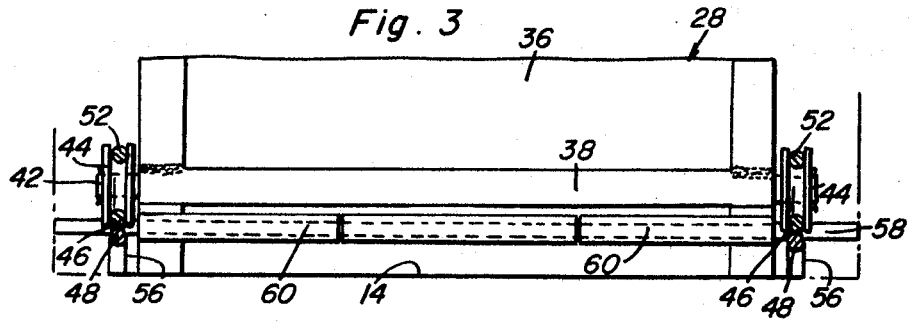
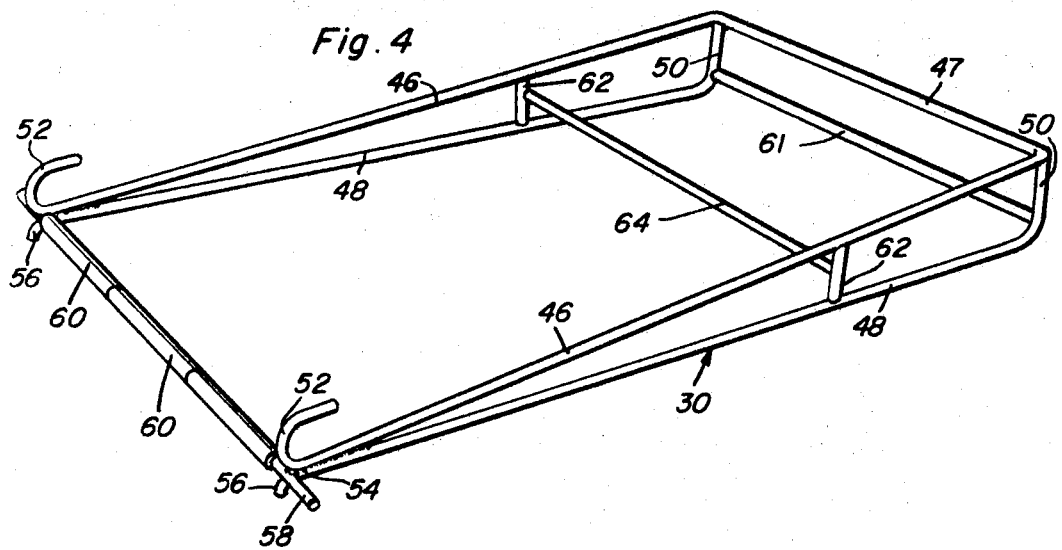
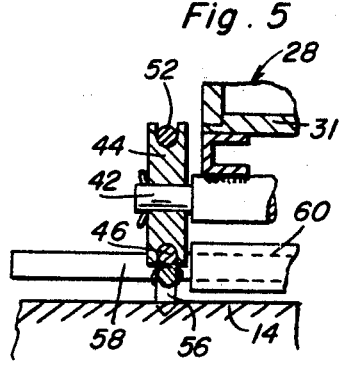
Garvis King
INVENTOR.

United States Patent Office 3,446,534
Patented May 27, 1969

3,446,534
AUXILIARY SELF-DUMPING TRUCK BED
Garvis King, P.O. Box 548, Spiro, Okla. 74959
Filed Jan. 13, 1967, Ser. No. 609,070
Int. Cl. B60p 1/30
U.S. Cl. 298—12                                   7 Claims

ABSTRACT OF THE DISCLOSURE

A self-dumping truck bed construction for removable support from a vehicle and including inclined guide means from which a load bed is supported by follower means engaged with the guide means and pivotally supported from the load bed, said follower means being positioned so that the load bed, when having a load disposed therein, will be overbalanced at the end thereof adjacent the lower end of the guide means thereby causing the load bed to tilt as the overbalanced portion thereof passes beyond the lower end of the guide means upon downward movement of the load bed along the guide means.

---

This invention relates to a novel and useful auxiliary self-dumping truck bed and more specifically to a base adapted to be supported in stationary position on a vehicle. The base may, if desired, be supported within the load bed of a pickup truck and includes inclined guide means whose lower end portions are to be disposed at the rear of the associated vehicle load bed and which supports an auxiliary load bed therefrom for downward movement therealong by means of follower means guidingly engaged with the guide means and pivotally supported from the auxiliary load bed for rotation about a generally horizontal axis extending transversely of the guide means along which the follower means are movable. In this manner, the auxiliary load bed is supported for movement by gravity along the guide means and is pivotable realtve to the guide means from a horizontal position toward a dumping position. The auxiliary load bed includes portions adjacent the lower end of the guide means and remote from the follower means which are adapted to support a corresponding portion of the auxiliary load bed against downward swinging movement about the axis of rotation of the auxiliary load bed relative to the follower means. However, the auxiliary load bed, when the follower means are engaged with the lower end of the guide means is adapted to project rearwardly of the associated vehicle load bed in manner enabling free downward swinging movement of the rearmost end of the auxiliary load bed to a dumping position and the follower means and guide means include coacting means limiting downward movement of the follower means along the guide means.

The main object of this invention is to provide an auxiliary self-dumping load bed for a truck that may be removably positioned in a non-dumpable load bed of a truck so as to adapt that truck to operate as a dump truck.

Another object of this invention is to provide an apparatus in accordance with the preceding object and which may be readily adapted for use on various vehicle load beds.

A final object of this invention to be specifically enumerated herein is to provide an apparatus in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary transverse vertical sectional view taken substantially upon the plane indicated by the section line 3—3 of FIGURE 2;

FIGURE 4 is a perspective view of the supporting and guide structure of the auxiliary load bed;

FIGURE 5 is an enlarged fragmentary transverse vertical sectional view taken substantially upon the plane indicated by the section line 5—5 of FIGURE 2.

Figure 1:
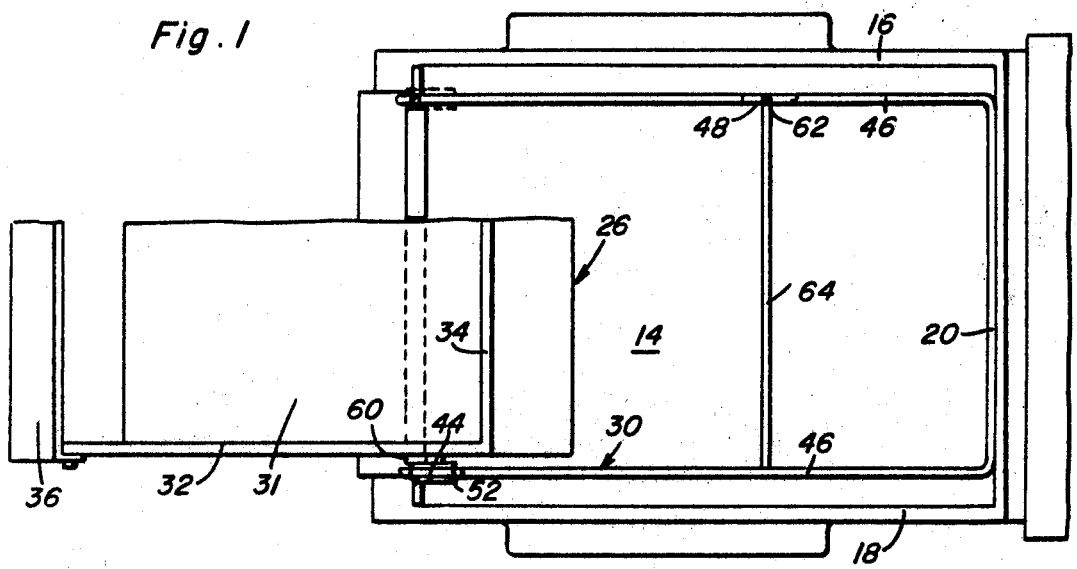
FIGURE 1 is a fragmentary top plan view of a conventional form of pickup truck with the auxiliary self-dumping truck bed of the instant invention operatively associated therewith and the dumpable load bed portion of the auxiliary bed in a dumping position, portions of the auxiliary load bed and supporting guide structure therefor being broken away and illustrated in horizontal section.

Referring now more specifically to the drawings the numeral 10 generally designates a conventional form of pickup truck including a load bed referred to in general by the reference numeral 12. The load bed 12 includes a bottom wall 14, a pair of upstanding opposite side walls 16 and 18, a front wall 20 and a tailgate 22 pivotally supported from the rear end of the bottom wall 14 by means of a hinge assembly 24.

The auxiliary self-dumping truck assembly of the instant invention is generally referred to by the reference numeral 26 and includes a load bed portion referred to in general by the reference numeral 28 and a load bed supporting and guiding structure or frame generally referred to by the reference numeral 30.

The load bed portion 28 includes a bottom wall 31, a pair of upstanding opposite side walls 32, a front wall 34 and a tailgate 36 pivotally supported at its upper marginal edge portion from the upper rear corners of the opposite side walls 32.

A tubular axle housing 38 is secured to and extends transversely beneath the bottom wall 31 and rotatably journals an axle member 42 therethrough on whose opposite ends double flanged wheels 44 are mounted.

The structure or frame 30 includes a pair of elongated rail members 46 which are generally parallel and interconnected at their forward ends by means of an integral cross member 47. The frame 30 further includes a pair of longitudinal members 48 which underlie the rail members 46 and whose forward ends are upturned as at 50 forming understanding members having their upper ends secured to the forward ends of the rail members 46. The rear ends of the rail members 46 curve upwardly and back toward the front ends to form hooked portions 52 and the rear ends of the rail members 46 are secured to the rear end portions of the longitudinal members 48 in a manner such that the rail members 46 are rearwardly and downwardly inclined relative to the longitudinal members 48 when the latter are disposed in a horizontal plane. Further, the rear ends of the longitudinal members 48 are secured to the rear ends of the rail members 46 in any convenient manner such as by welding 54 and include downwardly curving terminal end portions 56. A pair of rearwardly opening notches are defined by the adjacent portions of the hooked portions 52 and the downturned portions 56 and the opposite ends of a transverse support member 58 are welded in these notches also by means of the welding 54. The support member 58 has a plurality of rollers 60 journaled thereon intermediate the rail members 46 and the forward ends of the longitudinal members 48 are also interconnected by means of a transverse member 61 secured to and extending therebetween. Further, vertical brace members 62 are secured between corresponding rail and longitudinal members 46 adjacent the forward ends thereof and are braced relative to each other by means of a cross brace 64 secured to and extending between the brace members 62 centrally intermediate their opposite ends.

Figure 2:
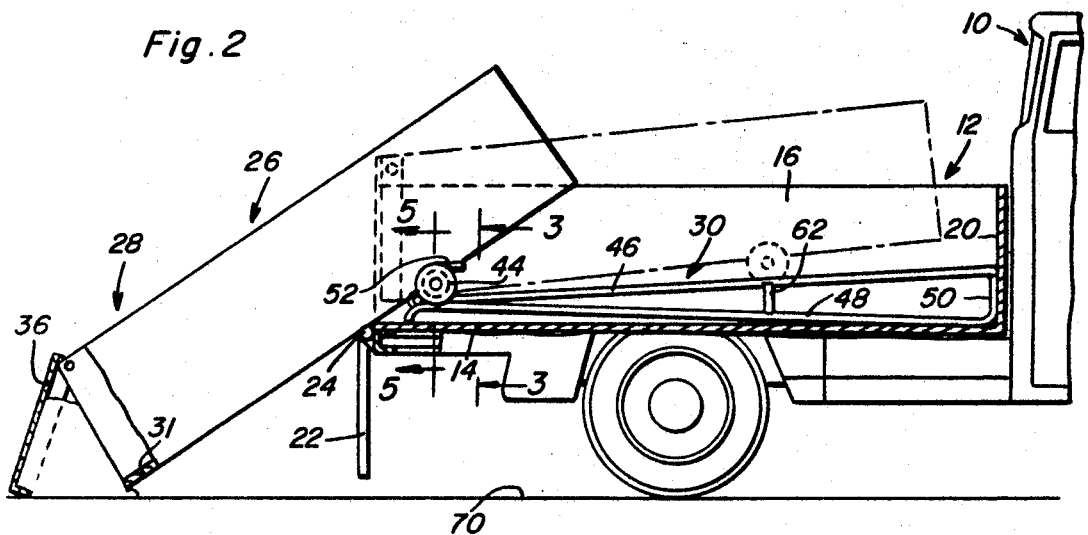
FIGURE 2 is a fragmentary side elevational view of the embodiment illustrated in FIGURE 1 and with portions of the truck and the auxiliary load bed construction illustrated in longitudinal vertical section.
Figure 6:
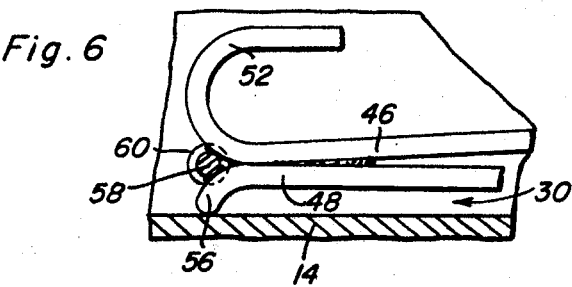
FIGURE 6 is a fragmentary enlarged longitudinal vertical sectional view of the rear portion of one side of the auxiliary bed supporting and guide structure.

The load bed portion 28 is supported from the structure 30 with the wheels 44 thereof rollingly and guidingly engaged with the rail members 46. Further, the load bed portion 28 is receivable within the pickup truck load bed 12 with the closed tailgate 36 of the former abutted against the inner surface of the closed tailgate 22 of the pickup truck load bed 12. In this manner, the tailgate 22 not only secures the load bed portion 28 in position against downward movement along the rail members 46 but also maintains the tailgate 36 of the load bed portion 28 in the closed position, the rear end edges of the side walls 32 and the tailgate 36 being slightly inclined relative to the longitudinal axis of the load bed portion 28 so as to be vertically disposed when the load bed portion 28 is in the inclined position thereof illustrated in phantom lines in FIGURE 2 of the drawings.

The frame 30 is positioned with the forward end thereof abutting against the inner surface of the front wall 20 of the pickup truck load bed 12 and the lower end portions of the downturned end portions 56 of the longitudinal members 48 frictionally engaging the rear marginal portion of the bottom wall 14 of the load bed 12 in order to prevent longitudinal shifting of the frame 30 relative to the load bed 12. Then, once the load bed portion 28 has been positioned as illustrated in phantom lines in FIGURE 2 of the drawings and the pickup truck tailgate 22 has been closed, the load bed portion 28 may be loaded with any suitable material which is to be ultimately dumped from the pickup truck 10. Then, after the pickup truck 10 has been driven to the dumping site, the tailgate 22 may be opened so as to allow the load bed portion 28 to roll down the rail members 46 to the position thereof illustrated in solid lines in FIGURE 2 of the drawings with the rear end of the load bed portion 28 swung downwardly. As the load bed portion 28 slides rearwardly with the rear end portion of the bottom wall 31 thereof rolling over the rollers 60, the downward inclination of the load bed portion 28 is gradually increased until the double flanged wheels 44 are seated in the hooked portions 52 of the rail members 46. This of course prevents further rearward movement of the load bed portion 28 and therefore downward swinging movement of the rear end portion of the load bed portion 28 since the bottom wall 31 of the load bed portion 28 rests upon the rollers 60. In addition, with attention invited specifically to FIGURE 2 of the drawings, when the double flanged wheels 44 are seated in the hooked portions 52 of the rail members 46 and the bottom wall 31 is resting upon the rollers 60, a portion of the bottom wall 31 disposed forwardly of the portions thereof contacting the rollers 60 is abutted against the hinge assembly 24 of the pickup truck load bed 12 by which the tailgate 22 is pivotally supported from the load bed 12. Thus, the load bed portion 28 is supported in its dumping position with the rear end of the bottom wall 31 spaced at least slightly above the supporting surface 70 on which the truck 10 rests in at least three points spaced longitudinally along the load bed portion 28. Of course, the tailgate 36 of the load bed portion 28 automatically swings to the open position when the load bed portion 28 assumes the dumping position thereof illustrated in solid lines in FIGURE 2 of the drawings with the load in the load bed portion 28 bearing against the tailgate 36. Further, the downturned end portions 56 serve to frictionally engage the bottom wall 14 and retain the frame 30 in position within the load bed 12. In addition, the members 48, 60, 64 and 58 may be constructed so as to be extendable and collapsible in length whereby the width of the frame 30 may be varied during use and also for compact storage.

What is claimed as new is as follows:

1. An auxiliary self-dumping load bed assembly including a base adapted to be supported in stationary position on a vehicle, said base including a pair of generally parallel horizontal front to rear extending longitudinal members interconnected at their front and rear ends by means of transverse members extending and secured therebetween, a pair of elongated front to rear extending rail members overlying said longitudinal members and inclined rearwardly and downwardly relative to the latter, the rear ends of said rail members being secured to the rear ends of said longitudinal members, upstanding members extending between and secured to the front ends of corresponding pairs of said longitudinal and rail members supporting the front ends of the latter in elevated position relative to the front ends of the former, a pair of upstanding brace members extending between and secured to corresponding pairs of said longitudinal and rail members intermediate the opposite ends, the rear ends of said rail members curving upwardly and forwardly, a load bed including opposite side forward flanged wheels supported on said rail members for rolling movement therealong, a rear transverse member extending and secured between the rear ends of said rail members, roller means journaled from said rear transverse member, the rear end of said load bed resting on said rollers means and being shiftable longitudinally of said base, said load bed being shiftable by gravity along said rail members in a direction moving said load bed toward the lower end portions of said rail members with said flange wheels abutting against and stopped by said upwardly curving rear ends of said rail members.

2. The combination of claim 1 wherein the lower portions of said rail member curved portions and the adjacent rear ends of said longitudinal members define rearwardly opening notches in which the opposite ends of the rear transverse brace members are secured.

3. The combination of claim 1 including an intermediate transverse brace member extending between and secured to the mid-portions of said upstanding brace members intermediate their upper and lower ends.

4. The combination of claim 1 wherein the inside radius of the curved portions of said rail members is substantially equal to the radius of the effective diameter of said wheels.

5. The combination of claim 1 wherein said load bed includes upstanding sides between whose rear ends an upstanding end gate extends, said end gate being pivotally supported from said sides for oscillation about an axis generally paralleling and adjacent the upper edge portion of said end gate.

6. The combination of claim 5 including a vehicle load bed on which said base is supported and including upstanding sides between which said auxiliary self-dumping load bed assembly is disposed, said vehicle load bed including an upstanding tailgate extending between the sides thereof and pivotally supported from said auxiliary bed assembly for oscillation about an axis generally paralleling and adjacent the lower edge portion of said tailgate.

7. The combination of claim 6 wherein said end gate is substantially vertically disposed and is abutted against the inner surface of said tailgate when the latter is closed and said tailgate removably locks said auxiliary load bed in elevated forwardly position on said rail members.

References Cited

UNITED STATES PATENTS

| | | | |
|---|---|---|---|
| 296,670 | 4/1884 | Bryan | 298–12 |
| 1,712,398 | 5/1929 | Palmero | 298–12 |
| 2,529,558 | 11/1950 | Klingebiel | 298–14 |
| 3,055,709 | 9/1962 | Kirkwood | 298–1 |
| 3,147,999 | 9/1964 | Daniels | 298–1 |

RICHARD J. JOHNSON, *Primary Examiner.*

U.S. Cl. X.R.

298—1